106. COMPOSITIONS, COATING OR PLASTIC.

Patented Sept. 28, 1926.

1,601,295

UNITED STATES PATENT OFFICE.

WILLIAM ARTHUR COLLINGS, OF SANTA MONICA, CALIFORNIA.

PLASTIC AND PROCESS OF MAKING THE SAME.

No Drawing.   Application filed December 11, 1923.   Serial No. 680,044.

This invention relates to plastics and processes of making the same; and it comprises as a new material a set or other calcareous composition containing in addition to the usual components a small proportion of temporarily waterproofed fine material of a colloid nature readily swelling with water, said waterproofed fine material occurring in the voids of the plastic; and it further comprises a method of making a waterproof concrete or other calcareous composition wherein cement or other calcareous binding material, with or without filling materials, is mixed or gaged with water in the usual manner, and to this mixture is added a certain proportion of temporarily waterproofed fine material capable of swelling with water, the waterproofing material being ordinarily in the nature of mineral oil; all as more fully hereinafter set forth and as claimed.

As is of course well known, the setting of cement in making concrete is due to hydration; the water of the mixture being taken up by the cement to form various hydrated bodies of about the same volume. The effort is to use the amount of cement which after hydration will just fill the voids; the cement being distributed over the surfaces of the particles of sand and aggregate. Well made fresh concrete is practically poreless; it contains no voids, or no great amount of voids, and is waterproof. This waterproof character it retains while it is moist or damp. As stated, the process of setting is a process of hydration in which the cement particles take up the water and increase in volume thereby. The exact nature of the actions which go on in hydration is not yet definitely known; or, at least, is controversial. But in the hydration actions, whatever they are, the water is not so firmly held as to have no substantial vapor tension; and in concrete exposed to drying conditions, there is a loss of moisture with time, and a resultant production of voids or pores. Concrete which has been exposed to drying conditions is no longer waterproof.

It has been proposed to obviate this after porosity and maintain the concrete waterproof; the invention consisting in incorporating a certain amount of fine bentonite into the concrete at the time of gaging. The bentonite does not take up the water during gaging where the usual proportions of water are employed; i. e., merely the amount required for the hydration of the cement, but remains in an unswollen condition during the setting. With a dry, more or less pervious, concrete thus produced, on subsequent access of moisture the included bentonite swells and substantially closes the pores.

Bentonite is sometimes described as a "swelling clay." Whether it is a true clay or not is not yet settled. On contact with water, dry bentonite takes it up and increases enormously in volume. For this reason, dry bentonite in concrete is particularly useful. With such bentonite, and particularly if it be given a slight roast preliminarily, the described swelling action does not take place readily in the time afforded in mixing the concrete. In mixing cement with a limited amount of water, as is done in making concrete, apparently the water goes to the cement preferentially; leaving the bentonite more or less unaffected. And the bentonite, unlike ordinary clays, does not hurt the strength of the concrete. Not all grades of bentonite however are as slow in swelling as is desirable; and on the other hand in making concrete it is sometimes desirable to use larger proportions of water. In these cases I have found it a useful expedient to give the bentonite a temporary waterproofing treatment by incorporating with it a certain amount of mineral oil. This mineral oil protects the bentonite from the action of the water or delays the access of water sufficiently to permit incorporation of the material, even in wet concrete and even if the bentonite be, for the present purposes, of low grade. And I have found that the same expedient may be used with a wide variety of other materials capable of swelling with water. As a matter of fact, with the aid of a temporary oil waterproofer there may be used any readily swellable material, clays, organic bodies, fine sawdust, etc. Its particular nature is not very important, as long as (a) it does not swell during the mixing or gaging of the concrete, and (b) it swells readily with any subsequent wetting of the concrete. As the temporary waterproofer, any of the relatively liquid or volatile mineral oils may be used. The oils so used have some other advantages in the operation. The presence of the oiled fine material contributes to plasticity and adds somewhat to the protective rust-preventing action of the concrete upon any reinforcing steel or iron it may contain. If the concrete dries and becomes porous, the oil spreads more or less away from the fine material and may evaporate in whole or in part. This depends upon the character of the oil used. The fine material then becomes susceptible to the action of seeping or penetrating moisture.

Utilizing the protective action of oil in the manner described, many ordinary clays of the true clay type may be used in lieu of bentonite. Such clays if unprotected exercise in gaging the ordinary well known undesirable influence of clay on the strength of the concrete but oiled they subserve the present purposes. Oiling the clay probably prevents true contact between cement substance and clay substance.

As the oil to be used, as stated, any fairly volatile or liquid mineral oil may be employed. A certain degree of volatility is desirable but not necessary. Kerosene, gas oil, spindle oils, crude oils, etc., may be used. The amount of oil employed is usually merely that which is taken up by the fine material, leaving it as a mass of discrete particles. However, for commercial purposes and for easy handling it is sometimes desirable to put up the waterproofing agent as a paste, adding to it somewhat more than the quantity of oil which is really necessary in gaging. This excess of oil does no harm, separating for the most part.

In the present invention, the bentonite or other swellable body used really plays the part of a gelatinizable "reversible colloid". As to the fineness of the material, much depends upon circumstances; on the use to which the concrete is to be applied and to its nature. Sometimes the swellable material is required quite fine, so that it will pass through a 100-mesh sieve. Sometimes, it is wanted in a rather coarser condition. In using bentonite, it may be admixed with the dry cement at any time prior to making the concrete; or it may be mixed at the time of making. Using bentonite, a proportion of 2 to 5 per cent of the final concrete, mortar or plaster, gives a concrete capable of withstanding a considerable hydrostatic head of water. Higher proportions may be used. A layer of concrete, stucco or plaster, waterproofed in the present manner, may be advantageously used as a facing for ordinary concrete in walls intended to resist dampness or water; building walls, reservoir walls, retaining walls, roofing tiles and facing. It may also be used in making waterproof concrete roads, etc.

Fine swellable materials temporarily protected by an oily waterproofer may be used with advantage in the case of various other calcareous cements, such as plaster of Paris, lime, mortars and concrete, etc. And I do not regard my invention as limited to concrete.

The treatment is particularly advantageous in the case of interior plaster walls of buildings, and in stucco and other plaster work. These require usually very thin sections, that is, are not of great thickness and they are very susceptible to penetration of rain and atmospheric dampness (sweating). Often these layers are not over an inch thick.

What is claimed is:

1. As a new material, a calcareous plastic containing disseminated therethrough temporarily waterproofed fine granular material, said material in itself being capable of swelling on access of water.

2. As a new material, a batch for concrete containing disseminated therethrough temporarily waterproofed fine granular material said material in itself being capable of swelling on access of water.

3. As a new material, a batch for concrete containing oiled bentonite distributed therethrough.

4. As a new material, a batch for concrete containing an oiled fine granular temporarily waterproofed material said material in itself being capable of swelling upon access of moisture thereto.

5. In the manufacture of concrete, the process which comprises incorporating with the wet mixture of cement and aggregrate, a small proportion of temporarily waterproofed fine granular matter capable of swelling upon subsequent access of moisture thereto.

6. In the manufacture of waterproof calcareous plastics, the process which comprises incorporating with wet calcareous plastic a small proportion of oiled fine granular matter temporarily waterproofed but capable of swelling upon subsequent access of moisture thereto.

7. In the manufacture of concrete, the process which comprises incorporating with the wet mixture of cement and aggregate, a small proportion of fine granular matter capable of swelling upon subsequent access of moisture thereto, said matter being protected during the mixing by the presence of a mineral oil.

8. In the manufacture of concrete, the process which comprises incorporating oiled bentonite with the wet mixture of cement and aggregate.

In testimony whereof, I have hereunto affixed my signature.

WILLIAM A. COLLINGS.